(12) United States Patent
Han et al.

(10) Patent No.: US 12,473,411 B2
(45) Date of Patent: *Nov. 18, 2025

(54) OPTICAL MULTILAYER STRUCTURE, METHOD OF MANUFACTURING THE SAME AND WINDOW COVER FILM COMPRISING THE SAME

(71) Applicants: SK INNOVATION CO., LTD., Seoul (KR); SK IE TECHNOLOGY CO., LTD., Seoul (KR)

(72) Inventors: Kyu Seok Han, Daejeon (KR); Cheol Woo Kim, Daejeon (KR); So Young Lee, Daejeon (KR); Jeong Min Choi, Daejeon (KR); Sin Woo Kim, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 393 days.

This patent is subject to a terminal disclaimer.

(21) Appl. No.: 18/298,729

(22) Filed: Apr. 11, 2023

(65) Prior Publication Data
US 2023/0323058 A1    Oct. 12, 2023

(30) Foreign Application Priority Data

Apr. 11, 2022 (KR) .................... 10-2022-0044420

(51) Int. Cl.
*C08J 7/04* (2020.01)
*C08J 7/043* (2020.01)
(Continued)

(52) U.S. Cl.
CPC ............... *C08J 7/042* (2013.01); *C08J 7/043* (2020.01); *C08J 7/18* (2013.01); *C08K 5/541* (2013.01);
(Continued)

(58) Field of Classification Search
CPC ... C08J 7/042; C08J 7/043; C08J 7/18; C08K 5/541; C09D 7/63; C09D 183/06; G02B 1/14; G02B 1/18
See application file for complete search history.

(56) References Cited

U.S. PATENT DOCUMENTS

| 2020/0056056 A1* | 2/2020 | Ahn ................. C09D 163/00 |
| 2020/0174161 A1* | 6/2020 | Ahn ................. C08G 73/1078 |
| 2023/0324585 A1* | 10/2023 | Choi ....................... G02B 1/18 |

FOREIGN PATENT DOCUMENTS

| CN | 113568075 A * 10/2021 ......... H10K 59/8791 |
| JP | 2006-265530 A   10/2006 |

(Continued)

OTHER PUBLICATIONS

CN 113568075A machine translation (Year: 2021).*

*Primary Examiner* — Blaine Copenheaver
(74) *Attorney, Agent, or Firm* — IP & T GROUP LLP (57) ABSTRACT

An optical multilayer structure including a hard coating layer, a low-reflective adhesion reinforcement layer, and a water repellent layer on a substrate layer. The optical multilayer structure includes a structure in which a hard coating layer, a low-reflective adhesion reinforcement layer including a siloxane-based compound, and a water repellent layer including an alkoxysilane-based compound containing a fluorine atom are laminated on a substrate layer, thereby having high wear resistance and water contact angle simultaneously.

19 Claims, 1 Drawing Sheet

(51) Int. Cl.
*C08J 7/18* (2006.01)
*C08K 5/541* (2006.01)
*C09D 7/63* (2018.01)
*C09D 183/06* (2006.01)

(52) U.S. Cl.
CPC ............ *C09D 7/63* (2018.01); *C09D 183/06* (2013.01); *C08J 2379/08* (2013.01); *C08J 2383/06* (2013.01)

(56) References Cited

FOREIGN PATENT DOCUMENTS

JP        2014-95740 A    5/2014
KR   10-2021-0036447 A    4/2021

* cited by examiner

OPTICAL MULTILAYER STRUCTURE, METHOD OF MANUFACTURING THE SAME AND WINDOW COVER FILM COMPRISING THE SAME

CROSS-REFERENCE TO RELATED APPLICATIONS

This application claims priority to Korean Patent Application No. 10-2022-0044420, filed Apr. 11, 2022. The entire contents of the above-listed application are hereby incorporated by reference for all purposes.

TECHNICAL FIELD

The following disclosure relates to an optical multilayer structure, a method of manufacturing the same, and a window cover film and a flexible display panel comprising the same.

BACKGROUND

Recently, thin display devices using flat panel display devices such as liquid crystal display devices or organic light emitting diode display devices are drawing attention. In particular, these thin displays are implemented in the form of a touch screen panel, and are widely used in various smart devices characterized by their portability comprising various wearable devices as well as smart phones and tablet PCs.

These portable touch screen panel-based displays are provided with a window cover for display protection on a display panel in order to protect the display panel from scratches or external impact, and in most cases, a tempered glass for a display is used as a window cover. The tempered glass for a display is characterized by being manufactured to be thinner than a regular glass, while having scratch resistance with high strength.

However, tempered glass is unsuitable for weight reduction of portable devices due to its heavy weight, is vulnerable to external shock, so that it is difficult to implement a combined characteristic of being not easily breakable (unbreakable), and not bendable beyond a certain level, so that tempered glass is unsuitable as a flexible display material having a bendable or foldable function.

SUMMARY

One embodiment of the present disclosure is directed to providing an optical multilayer structure having low reflectance, and high wear resistance and water contact angle.

Another embodiment of the present disclosure is directed to providing a method of manufacturing an optical multilayer structure having low reflectance, and a high wear resistance and a high water contact angle.

Another embodiment of the present disclosure is directed to providing a window cover film comprising the optical multilayer structure.

Still another embodiment of the present disclosure is directed to providing a flexible display panel comprising the window cover film.

In one general aspect, an optical multilayer structure of the present disclosure comprises:
a substrate layer;
a hard coating layer formed on one surface of the substrate layer;
a low-reflective adhesion reinforcement layer which is formed on the hard coating layer and comprises a siloxane-based compound; and
a water repellent layer which is formed on the low-reflective adhesion reinforcement layer and comprises an alkoxysilane-based compound containing a fluorine atom,
wherein the optical multilayer structure has a reflectance in accordance with ASTM E1164 of 4% or less.

In another general aspect of the present disclosure, a method of manufacturing an optical multilayer structure comprises:
applying a composition for forming a hard coating layer on one surface of a substrate layer and curing the composition to form a hard coating layer;
applying a composition for forming a low-reflective adhesion reinforcement layer comprising a siloxane-based compound on the hard coating layer and drying the composition to form a low-reflective adhesion reinforcement layer; and
applying a composition for forming a water repellent layer comprising an alkoxysilane-based compound containing a fluorine atom on the low-reflective adhesion reinforcement layer and drying the composition to form a water repellent layer.

In another general aspect of the present disclosure, a window cover film comprises the optical multilayer structure described above.

In still another general aspect of the present disclosure, a flexible display panel comprises the window cover film.

Other features and aspects will be apparent from the following detailed description, the drawings, and the claims.

DETAILED DESCRIPTION OF MAIN ELEMENTS

100: optical multilayer structure
10: substrate layer
20: hard coating layer
30: low-reflective adhesion reinforcement layer
40: water repellent layer

DETAILED DESCRIPTION OF EMBODIMENTS

Hereinafter, an optical multilayer structure according to one embodiment, a method of manufacturing the same, a window cover film comprising the same, and a flexible display panel comprising the window cover film will be described in detail.

Herein, unless otherwise defined, all technical terms and scientific terms have the same meanings as those understood by a person skilled in the art. The terms used in the description of the present specification are only for effectively describing certain specific examples, and are not intended to limit any of the disclosed embodiments. In addition, the singular form used in the specification and claims appended thereto may also comprise a plural form, unless otherwise indicated in the context.

Throughout the specification, unless explicitly described to the contrary, "comprising" any constituent elements will be understood to imply further inclusion of other constituent elements.

Hereinafter, unless otherwise defined in the present specification, it will be understood that when a part such as a layer, a film, a thin film, a region, or a plate is referred to as being "on" or "above" another part, it may comprise not only the case of being "directly on" the other part but also the case of having an intervening part therebetween.

Hereinafter, unless otherwise particularly defined in the present specification, the term "A and/or B" may refer to an embodiment comprising both A and B or an embodiment selecting one of A and B.

Hereinafter, unless otherwise defined in the present specification, a "polymer" may comprise an oligomer and a polymer, and may comprise a homopolymer and a copolymer. The copolymer may comprise an alternating polymer, a block copolymer, a random copolymer, a branched copolymer, a crosslinked copolymer, or all of these polymers.

Hereinafter, unless otherwise particularly defined, the term "flexible" may refer to warping, being bent, or being folded.

Hereinafter, unless otherwise particularly defined in the present specification, "polyimide" comprises an imide structure, and may be used in the meaning of comprising "polyimide" or "polyamideimide."

Hereinafter, unless otherwise particularly defined, any ranges described herein for the elements or properties thereof described herein include all intermediate values and all immediate ranges.

Hereinafter, unless otherwise particularly defined, terms such as "excellent", "high", "improved" and the like are relative terms indicating that the associated items are improved relative the same items in the prior art not having the attribute(s) of the invention(s) described herein.

Figure 1:
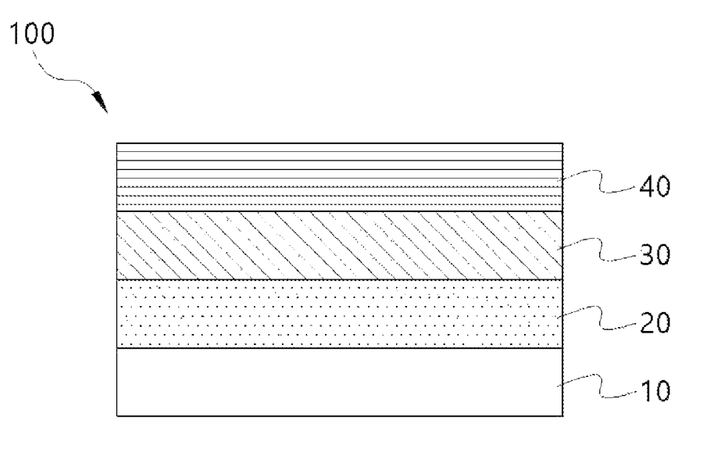
FIG. 1 shows a schematized structure of an optical multilayer structure according to one embodiment.

One embodiment of the present disclosure provides an optical multilayer 100 structure comprising as shown in FIG. 1:

a substrate layer 10;
a hard coating layer 20 formed on a first surface of the substrate layer 10;
a low-reflective adhesion reinforcement layer 30 formed on the hard coating layer 20 and which comprises a siloxane-based compound; and
a water repellent layer 40 comprising an alkoxysilane-based compound containing a fluorine atom.

In another embodiment, the substrate layer 10, the hard coating layer 20, the low-reflective adhesion reinforcement layer 30, and the water repellent layer 40 may be laminated in order, and each layer may be laminated in direct contact with each other (or another layer may be formed between the layers).

Hereinafter, each component of the substrate layer 10, the hard coating layer 20, the low-reflective adhesion reinforcement layer 30, and the water repellent layer 40 comprised in the optical multilayer structure according to various embodiments are described in more detail below without reference to the enumerations in FIG. 1.

Substrate Layer

In one embodiment, the substrate layer may be prepared from, for example, polyester-based resins such as for example polyethylene terephthalate, polyethylene isophthalate, and polybutylene terephthalate; cellulose-based resins such as for example diacetyl cellulose and triacetyl cellulose; polycarbonate-based resins; acrylic resins such as for example polymethyl (meth)acrylate and polyethyl (meth)acrylate; styrene-based resins such as for example a polystyrene acrylonitrile-styrene copolymer; polyolefin-based resin such as for example polyethylene, polypropylene, polyolefin-based resin having a cyclo-based or norbornene structure, and ethylenepropylene copolymer; polyimide-based resins; polyaramide-based resins; polyethersulfone-based resins; sulfone-based resins; and the like, and these resins may be used alone or in combination of two or more, but the present disclosure is not necessarily limited thereto. In another embodiment, the substrate layer may have improved transparency, improved mechanical strength, improved thermal stability, improved moisture shielding properties, and/or improve isotropy, and the like.

In still another embodiment, the substrate layer may be a polyimide-based substrate layer formed of a polyimide-based resin comprising a chemical group derived from a fluorine-based aromatic diamine, in which the polyimide-based resin may comprise both a polyimide resin and a polyamideimide resin.

In another embodiment, the polyimide-based substrate layer comprises a polyamideimide resin comprising an aliphatic cyclic structure and a fluorine atom, and as a specific example, may be a polyimide-based substrate layer comprising a chemical group derived from a fluorine-based aromatic diamine, an aromatic dianhydride, and an aromatic diacid dichloride, and as a more specific example, may be a polyimide-based substrate layer further comprising a chemical group derived from a cycloaliphatic dianhydride, but the present invention is not necessarily limited thereto.

In still another embodiment, the substrate layer does not cause a rainbow phenomenon or a mura phenomenon, and therefore has improved optical properties, further lowers the haze of a window cover film, may further increase a total light transmittance, and may be characterized as transparent as opposed to opaque.

In yet an embodiment, the thickness of the substrate layer is not particularly limited, and for example, may be 10 μm to 150 μm, 10 μm to 100, 20 μm to 80 μm, 30 μm to 70 μm, or 40 μm to 60 μm, but the present disclosure is not necessarily limited thereto.

In another embodiment, the refractive index of the substrate layer may range from 1.2 to 2.0, 1.3 to 1.9, 1.4 to 1.8, 1.5 to 1.8, 1.5 to 1.7, or 1.6 to 1.8, but the present disclosure is not necessarily limited thereto.

In another embodiment, the substrate layer may be prepared using a composition for forming a substrate layer prepared as follows. While the following describes how the substrate layer is prepared, the present disclosure is not necessarily limited to the details in this description. In a reactor under a nitrogen atmosphere, terephthaloyl dichloride (TPC) and 2,2'-bis(trifluoromethyl)-benzidine (TFMB) are added to a mixed solution of dichloromethane and pyridine, and stirring is performed at 25° C. for 2 hours under a nitrogen atmosphere. At this time, TPC and TFMB are added at a mole ratio of 3:4 and the solid content is adjusted to 10 wt % to perform polymerization. Thereafter, the product is precipitated in an excessive amount of methanol and filtered to obtain a solid content, which is dried under vacuum at 50° C. for 6 hours or more to obtain an oligomer, and the prepared oligomer may have a formula weight (FW) of 1670 g/mol.

N,N-dimethylacetamide (DMAc) as a solvent, 100 mol of the oligomer, and 28.6 mol of 2,2'-bis(trifluoromethyl)-benzidine (TFMB) are added to the reactor and sufficient stirring is performed. Thereafter, 64.3 mol of cyclobutanetetracarboxylic dianhydride (CBDA) and 64.3 mol of 4,4'-hexafluoroisopropylidene diphthalic dianhydride (6FDA) are added to the reactor, and polymerization is performed at 40° C. for 10 hours with sufficient stirring.

Herein, the content of the solid content of the reaction solution may be 20 wt % or may be adjusted to 20 wt %. Subsequently, pyridine and an acetic acid anhydride are sequentially added 2.5 times the moles of the total content of the dianhydride, respectively, and stirring is performed at 60° C. for 12 hours. After the polymerization is completed, the polymerization solution is precipitated in an excessive amount of methanol and filtered to obtain a solid content, which is dried under vacuum at 50° C. for 6 hours or more, thereby obtaining polyamideimide powder. The powder is diluted and dissolved at 20 wt % in DMAc to prepare a composition for forming a substrate layer.

Next, the composition for forming a substrate layer is applied on a support (e.g., a flexible glass or flexible plastic substrate) using an applicator, dried at 80° C. for 30 minutes and at 100° C. for 1 hour, and cooled at room temperature to prepare a film. Thereafter, a stepwise heat treatment at 100 to 200° C. for 120 minutes and 250 to 300° C. for 48 minutes (40% of a total heat treatment time) at a heating rate of 20° C./min is performed to prepare a substrate layer having a thickness of 50 μm.

Hard Coating Layer

In another embodiment, a hard coating layer may be formed on one or both surfaces (i.e., first and second surfaces) of the substrate layer, thereby protecting the substrate layer from external physical and chemical damage.

In one embodiment, the hard coating layer may be formed by curing a composition for forming a hard coating layer, and also, may be a composite hard coating layer obtained by photocuring and then thermally curing the composition for forming a hard coating layer, but the present disclosure is not necessarily limited thereto.

In one embodiment, the hard coating layer may be formed by comprising a condensate of alkoxysilane having an epoxy group, and for example, the condensate of alkoxysilane having an epoxy group may be a siloxane resin comprising an epoxy group, but the present disclosure is not necessarily limited thereto. The condensate of alkoxysilane having an epoxy group may have improved hardness and bending properties when cured.

The epoxy group may be any one or more selected from a cyclic epoxy group, an aliphatic epoxy group, and an aromatic epoxy group, and the siloxane resin may refer to a polymer compound in which a silicon atom and an oxygen atom form a covalent bond.

In one embodiment, the condensate of alkoxysilane having an epoxy group may be a silsesquioxane resin having an epoxy group, and specifically, a silsesquioxane resin in which a silicon atom is directly substituted with an epoxy group or a substituent of the silicon atom is substituted with an epoxy group, and more specifically, the condensate of alkoxysilane having an epoxy group may be a silsesquioxane resin substituted with 2-(3,4-epoxycyclohexyl)ethyl group, but the present disclosure is not necessarily limited thereto.

In still another embodiment, the condensate of alkoxysilane having an epoxy group may have a weight average weight average molecular weight ranging from 1,000 g/mol to 20,000 g/mol, 1,000 g/mol to 18,000 g/mol, or 2,000 g/mol to 15,000 g/mol. When the weight average molecular weight is in the described range, flowability, coatability, curing reactivity, and the like of the composition for forming a hard coating layer may be further improved.

In yet another embodiment, the condensate of alkoxysilane having an epoxy group may comprise a repeating unit derived from an alkoxysilane compound represented by the following Chemical Formula 1:

[Chemical Formula 1]

wherein $R^1$ is a straight-chain or branched-chain alkyl group having 1 to 6 carbon atoms substituted with an epoxycycloalkyl group having 3 to 6 carbon atoms or an oxiranyl group, in which the alkyl group may comprise an ether group, $R^2$ is a linear or branched alkyl group having 1 to 7 carbon atoms, and n is an integer of 1 to 3.

The alkoxysilane compound represented by Chemical Formula 1 may be, for example, 2-(3,4-epoxycyclohexyl) ethyltrimethoxysilane, 2-(3,4-epoxycyclohexyl) ethyltriethoxysilane, 3-glycidoxypropyltrimethoxysilane, and the like and may be used alone or in combination of two or more, but the present disclosure is not necessarily limited thereto.

In still another embodiment, the condensate of alkoxysilane having an epoxy group may be comprised at 20 parts by weight to 70 parts by weight (and intervening weights) or 20 parts by weight to 50 parts by weight (and intervening weights) with respect to 100 parts by weight of the composition for forming a hard coating layer, but the present disclosure is not necessarily limited thereof.

In one embodiment, the composition for forming a hard coating layer may have improved flowability and coatability, may be uniformly cured during the curing of the composition for forming a hard coating layer to allow effective prevention of physical defects such as cracks by overcuring, and may show improved hardness.

In another embodiment, the hard coating layer may be formed by further comprising a crosslinking agent having a polyfunctional epoxy group. Herein, the crosslinking agent may comprise a compound having an alicyclic epoxy group, and for example, the crosslinking agent may comprise a compound having two 3,4-epoxycyclohexyl group bonded, but the present disclosure is not necessarily limited thereto. The crosslinking agent may have a structure and properties similar to the condensate of alkoxysilane having an epoxy group, and in this case, may promote crosslinking of the condensate of alkoxysilane having an epoxy group.

In yet another embodiment, the hard coating layer may have a thickness of 1 μm to 100 μm, 1 μm to 80 μm, 1 μm to 50 μm, 1 μm to 30 μm, 1 μm to 20 μm, or 1 μm to 10 μm but the present disclosure is not necessarily limited thereto.

In still another embodiment, the hard coating layer may have a refractive index of 1.50 to 1.54, 1.51 to 1.53, or 1.52 to 1.53, but the present disclosure is not necessarily limited thereto.

Hereinafter, a method of forming a hard coating layer will be described.

The hard coating layer is formed by preparing a composition for forming a hard coating layer, applying the composition on a substrate layer, and curing the composition.

In one embodiment, the composition for forming a hard coating layer may comprise a condensate of alkoxysilane having an epoxy group, in which the condensate of alkoxysilane having an epoxy group may be the same as those described above for the hard coating layer.

In another embodiment, the composition for forming a hard coating layer may further comprise a photoinitiator and a thermal initiator comprising a compound represented by the following Chemical Formula 2:

[Chemical Formula 2]

wherein $R^3$ is hydrogen, an alkoxycarbonyl group having 1 to 4 carbon atoms, an alkylcarbonyl group having 1 to 4 carbon atoms, or an arylcarbonyl group having 6 to 14 carbon atoms, $R^4$ is independent of each other hydrogen, a halogen, or an alkyl group having 1 to 4 carbon atoms, n is 1 to 4, $R^5$ is an alkyl group having 1 to 4 carbon atoms or an aralkyl group having 7 to 15 carbon atoms which may be substituted with an alkyl group having 1 to 4 carbon atoms, $R^6$ is an alkyl group having 1 to 4 carbon atoms, and X is $SbF_6$, $PF_6$, $AsF_6$, $BF_4$, $CF_3SO_3$, $N(CF_3SO_2)_2$, or $N(C_6F_5)_4$.

The alkoxycarbonyl group has an alkoxy portion having 1 to 4 carbon atoms, and for example, may be a methoxycarbonyl group, an ethoxycarbonyl group, a propoxycarbonyl group, and the like.

In one embodiment, the alkylcarbonyl group has an alkyl portion having 1 to 4 carbon atoms, and for example, may be an acetyl group, a propionyl group, and the like.

The arylcarbonyl group has an aryl portion having 6 to 14 carbon atoms, and for example, may be a benzoyl group, a 1-naphthylcarbonyl group, a 2-naphthylcarbonyl group, and the like.

The aralkyl group may be, for example, a benzyl group, a 2-phenylethyl group, a 1-naphthylmethyl group, a 2-naphthylmethyl group, and the like.

When the compound of Chemical Formula 2 is used as a thermal initiator, a cure half-life may be shortened, and thermal curing may be rapidly performed even in low-temperature conditions, and thus, damage and deformation due to a long-term heat treatment under high-temperature conditions may be prevented.

The thermal initiator may promote the crosslinking reaction of the epoxy siloxane resin or the crosslinking agent described later when heat is applied to the composition for forming a hard coating layer. As the thermal initiator, a cationic thermal initiator may be used, but the present disclosure is not necessarily limited thereto.

In addition, by using photocuring with a photoinitiator in combination with the thermal curing using a thermal initiator, the curing degree, the hardness, the flexibility, and the like of the hard coating layer may be improved. For example, initially, the composition for forming a hard coating layer is applied to a substrate or the like and irradiated with ultraviolet rays (photocuring) to at least partially cure the composition, and thereafter heat is applied (thermal curing), thereby performing substantially a complete curing.

The composition for forming a hard coating layer may be semi-cured or partially cured by the photocuring, and the semi-cured or partially cured composition for forming a hard coating layer may be substantially completely cured by the thermal curing.

For example, when the composition for forming a hard coating layer is cured only by the photocuring, a curing time may be excessively extended or curing may not be completely performed in some parts. However, when the photocuring is followed by the thermal curing, the portion which is not cured by the photocuring may be substantially completely cured by the thermal curing, and the curing time may be also reduced.

In addition, in general, a portion which has been already appropriately cured by photocuring is provided with excessive energy (light) due to an increased curing time (for example, an increased light exposure time), thereafter the portion may be overcured. If overcuring proceeds, then the hard coating layer loses flexibility or mechanical defects such as curls or cracks may occur. However, when the photocuring and the thermal curing are used in combination, the composition for forming a hard coating layer may be substantially completely cured within a short time, and the hardness of the hard coating layer may be further increased while the flexibility of the hard coating layer is maintained.

Though the method of first photocuring and then further thermally curing the composition for forming a hard coating layer has been described above, the sequence of the photocuring and the thermal curing is not particularly limited thereto. That is, in some embodiments, the thermal curing may be first performed, and then the photocuring may be performed, or vice versa.

In another embodiment, the thermal initiator may be comprised of 0.1 parts by weight to 20 parts by weight or 1 part by weight to 20 parts by weight with respect to 100 parts by weight of the condensate of alkoxysilane having an epoxy group, but present disclosure is not necessarily limited thereto.

In addition, for example, the thermal initiator may be comprised at 0.01 parts by weight to 15 parts by weight, 0.1 parts by weight to 15 parts by weight, or 0.3 parts by weight to 10 parts by weight with respect to a total of 100 parts by weight of the composition for forming a hard coating layer, but the present disclosure is not necessarily limited thereto.

In one embodiment, the photoinitiator may comprise a photocationic initiator. The photocationic initiator may initiate polymerization of the epoxy siloxane resin and an epoxy-based monomer.

As the photo-cationic initiator, an onium salt and/or an organic metal salt, and the like may be used, and for example, a diaryliodonium salt, a triarylsulfonium salt, an aryldiazonium salt, an iron-arene composite, and the like may be used alone or in a combination of two or more, but the present disclosure is not necessarily limited thereto.

The content of the photoinitiator is not particularly limited, but for example, the photoinitiator may be comprised at 0.1 parts by weight to 15 parts by weight or 1 part by weight to 15 parts by weight with respect to 100 parts by weight of the condensate of alkoxysilane having an epoxy group, but present disclosure is not necessarily limited thereto.

In addition, for example, the photoinitiator may be comprised at 0.01 parts by weight to 10 parts by weight (in, 0.1 parts by weight to 10 parts by weight, or 0.3 parts by weight to 5 parts by weight with respect to a total of 100 parts by weight of the composition for forming a hard coating layer, but the present disclosure is not necessarily limited thereto.

In another embodiment, the composition for forming a hard coating layer may further comprise a crosslinking agent. For example, the crosslinking agent may form crosslinks with the condensate of alkoxysilane having an epoxy group to solidify the composition for forming a hard coating layer and increase the hardness of the hard coating layer.

In another embodiment, the crosslinking agent may comprise a compound having an alicyclic epoxy group. For example, the crosslinking agent may comprise a compound in which two 3,4-epoxycyclohexyl groups are connected to each other, but the present disclosure is not necessarily limited thereto. The crosslinking agent may have a structure and properties similar to the condensate of alkoxysilane having an epoxy group, and in this case, the crosslinking agent may promote the crosslinking of the condensate of alkoxysilane having an epoxy group while maintaining an appropriate viscosity of the composition prior to crosslinking.

In one embodiment, the crosslinking agent may be comprised at 5 parts by weight to 150 parts by weight with respect to 100 parts by weight of the condensate of alkoxysilane having an epoxy group, but the present disclosure is not necessarily limited thereto. The viscosity of the composition prior to crosslinking may be maintained in an appropriate range by the crosslinking agent, and applicability and curing reactivity may be more improved.

In addition, for example, the crosslinking agent may be comprised at 1 part by weight to 30 parts by weight or 5 parts by weight to 20 parts by weight with respect to a total of 100 parts by weight of the composition for forming a hard coating layer, but the present disclosure is not necessarily limited thereto.

In another embodiment, the composition for forming a hard coating layer may further comprise a thermal curing agent.

The thermal curing agent may comprise amine-based, imidazole-based, acid anhydride-based, and amide-based thermal curing agents, and the like, and these may be used alone or in a combination of two or more, but the present disclosure is not necessarily limited thereto.

In another embodiment, the thermal curing agent may be comprised at 5 parts by weight to 30 parts by weight with respect to 100 parts by weight of the condensate of alkoxysilane having an epoxy group, but the present disclosure is not necessarily limited thereto. The curing efficiency of the composition for forming a hard coating layer may be further improved by the thermal curing agent to form a hard coating layer having better hardness.

In one embodiment, the composition for forming a hard coating layer may further comprise a solvent. The solvent is not particularly limited and may be a solvent known in the art.

Non-limiting examples of the solvent may comprise alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), hexane-based solvents (such as hexane, heptane, and octane), benzene-based solvents (such as benzene, toluene, and xylene), and the like. These may be used alone or in combination of two or more.

The content of the solvent is not particularly limited, and for example, may be 10 parts by weight to 200 parts by weight with respect to 100 parts by weight of the condensate of alkoxysilane having an epoxy group. When the solvent is used, the composition for forming a hard coating layer may secure an appropriate level of viscosity, and thus, workability during formation of the hard coating layer may be better. In addition, it is relatively easy to adjust the thickness of the hard coating layer, and in this case a solvent drying time will be reduced, whereby a more rapid process speed may be secured.

In another embodiment, the solvent may be used in a residual amount excluding the amount of the remaining components in the total weight of a predetermined entire composition. For example, when the total weight of the predetermined entire composition is 100 g and the sum of the weights of the components other than the solvent is 70 g, 30 g of the solvent may be used, but the present disclosure is not necessarily limited thereto.

In one embodiment, the composition for forming a hard coating layer may further comprise an inorganic filler. The inorganic filler may further increase the hardness of the hard coating layer.

The inorganic filler is not particularly limited, and an example thereof may comprise metal oxides such as silica, alumina, and titanium oxide; hydroxides such as aluminum hydroxide, magnesium hydroxide, and potassium hydroxide; metal particles such as gold, silver, bronze, nickel, and alloys thereof; conductive particles such as carbon, carbon nanotubes, and fullerene; glass; ceramic; and the like, or in terms of compatibility with other components of the composition for forming a hard coating layer, silica may be used, and these inorganic filers may be used alone or in a combination of two or more, but the present disclosure is not necessarily limited thereto.

In still another embodiment, the composition for forming a hard coating layer may further comprise a lubricant. The lubricant may further improve winding efficiency, blocking resistance, wear resistance, scratch resistance, and the like.

The kind of lubricant is not particularly limited, and for example, waxes such as polyethylene wax, paraffin wax, synthetic wax, or montan wax; synthetic resins such as silicon-based resins and fluorine-based resins; and the like may be used, and these may be used alone or in combination of two or more, but the present disclosure is not necessarily limited thereto.

Besides, the composition for forming a hard coating layer may further comprise additives such as, for example, an antioxidant, a UV absorber, a photostabilizer, a thermal polymerization inhibitor, a leveling agent, a surfactant, a lubricant, and an antifouling agent.

Low-Reflective Adhesion Reinforcement Layer

In one embodiment, a low-reflective adhesion reinforcement layer may be formed on the hard coating layer, and for example, the low-reflective adhesion reinforcement layer may be formed in contact with the upper surface of the hard coating layer.

In another embodiment, the low-reflective adhesion reinforcement layer may comprise a siloxane-based compound, and the siloxane-based compound may be, for example, a compound represented by the following Chemical Formula 3 or a polymer thereof:

$$Si(OR^7)_a(R^8)_{4-a} \qquad \text{[Chemical Formula 3]}$$

wherein $R^7$ and $R^8$ are independent of each other hydrogen, a straight-chain or branched-chain alkyl group having 1 to 20 carbon atoms, a straight-chain or branched-chain alkenyl group having 1 to 20 carbon atoms, or a straight-chain or branched-chain alkynyl group having 1 to 20 carbon atoms, in which the number of carbons may be 1 to 15, 1 to 10, 1 to 5, or 1 to 3 carbon atoms, and a is an integer of 1 to 4.

In another embodiment, the siloxane-based compound may be tetraethyl orothosilicate (TEOS), tetramethyl orothosilicate (TMOS), tetrapropyl orothosilicate (TPOS), tetrabutyl orothosilicate (TBOS), and/or a copolymer thereof.

In another embodiment, the low-reflective adhesion reinforcement layer may be formed with an alkoxysilane-based compound having one or more functional groups. The alkoxysilane-based compound having one or more functional groups is an alkoxysilane-based compound substituted with one or two or more functional groups, and for example, a silicon atom of the alkoxysilane-based compound may be directly substituted with the functional group or a substituent substituted on a silicon atom (for example, an alkyl group) or the like may be substituted with the functional group. That is to say, it may be a compound in which an alkyl group substituted with one or two or more functional groups is connected to a silicon atom, but the present disclosure is not necessarily limited thereto.

In yet another embodiment, the functional group may be an organofunctional group, and for example, the organofunctional group may be any one selected from an amino group, an amide group, a carboxyl group, an ester group, an acryl group, an epoxy group, an isocyanate group, and the like, or a combination thereof, but the present disclosure is not necessarily limited thereto.

Since an alkoxysilane-based compound having an organofunctional group has both an alkoxysilane group which reacts with an inorganic material and an organofunctional group forming a chemical bond with an organic material in the molecule, it has an improved ability to combine with an organic material and with an inorganic material, and may decrease the surface energy of an organic material to further increase adhesive strength with an inorganic material. In addition, the alkoxysilane-based compound having an organofunctional group may increase compatibility with other resins.

Therefore, in still another embodiment, when the alkoxysilane-based compound having one or more functional groups (which may be comprised in the low-reflective adhesion reinforcement layer) has both the organofunctional group and an alkoxysilane group, the alkoxysilane-based compound comprised in the low-reflective adhesion reinforcement layer may form a chemical bond with both the condensate of alkoxysilane having an epoxy group of the hard coating layer and the fluorine-containing alkoxysilane-based compound of the water repellent layer.

In one embodiment, when the low-reflective adhesion reinforcement layer is formed between the hard coating layer and the water repellent layer, a binding force between each layer of the optical multilayer structure is significantly improved, and high wear resistance, water contact angle, and scratch resistance may be implemented.

In another embodiment, a commercialized example of the alkoxysilane-based compound having one or more functional groups may comprise KBM-402, KBM-603, KBM-903, KBM-802, and the like available from Shin-etsu, but these alkoxysilane-based compounds having one or more functional groups are only non-limiting examples, and the present disclosure is not necessarily limited thereto.

In one embodiment, the low-reflective adhesion reinforcement layer is disposed between the hard coating layer and the water repellent layer, thereby significantly increasing the initial water contact angle of the water repellent layer and improving wear resistance and scratch resistance.

In one embodiment, the thickness of the low-reflective adhesion reinforcement layer may be selected as a value derived from the following Equation 5:

$$d=(m\times550)/(4\times n1) \qquad \text{[Equation 5]}$$

wherein d is a thickness (unit: nm) of the low-reflective adhesion reinforcement layer, m is an integer of 1 or 3, and n1 is a refractive index of the low-reflective adhesion reinforcement layer.

In another embodiment, the thickness of the low-reflective adhesion reinforcement layer may be a value in a range of ±50 nm of the value derived from Equation 5, and the refractive index of the low-reflective adhesion reinforcement layer described in the present specification may be substituted into n1 without limitation.

In another embodiment, the thickness of the low-reflective adhesion reinforcement layer may be 50 nm to 500 nm, for example, 50 nm to 200 nm, 50 nm to 150 nm, 80 nm to 120 nm, 200 nm to 500 nm, 200 nm to 400 nm, or 250 nm to 350 nm, but the present disclosure is not necessarily limited thereto.

In yet another embodiment, the refractive index of the low-reflective adhesion reinforcement layer may be 1.35 or more, 1.35 to 1.48, 1.35 to 1.50, 1.38 to 1.50, 1.42 to 1.48, 1.43 to 1.48, 1.44 to 1.48, or 1.44 to 1.47, but the present disclosure is not necessarily limited thereto.

Hereinafter, a method of forming a low-reflective adhesion reinforcement layer will be described.

The low-reflective adhesion reinforcement layer is formed by preparing a composition for forming a low-reflective adhesion reinforcement layer, applying the composition on the hard coating layer, and drying the composition.

In one embodiment, the composition for forming a low-reflective adhesion reinforcement layer may comprise a siloxane-based compound, in which the siloxane-based compound may be the same as those described for the low-reflective adhesion reinforcement layer.

In another embodiment, the composition for forming a low-reflective adhesion reinforcement layer may further comprise an alkoxysilane-based compound having one or more functional groups, in which the alkoxysilane-based compound having one or more functional groups may be those as described above for the low-reflective adhesion reinforcement layer.

In one embodiment, the composition for forming a low-reflective adhesion reinforcement layer may further comprise utilizing a solvent. The solvent is not particularly limited and may be a solvent known in the art.

Non-limiting example of the solvent may comprise alcohol-based solvents (such as methanol, ethanol, isopropanol, butanol, methyl cellosolve, and ethyl cellosolve), ketone-based solvents (such as methyl ethyl ketone, methyl butyl ketone, methyl isobutyl ketone, diethyl ketone, dipropyl ketone, and cyclohexanone), and the like. These may be used alone or in combination of two or more.

Water Repellent Layer

In another embodiment, the water repellent layer may be formed on the low-reflective adhesion reinforcement layer, and for example, the water repellent layer may be formed in contact with the upper surface of the low-reflective adhesion reinforcement layer.

In another embodiment, the water repellent layer may be formed by using an alkoxysilane-based compound containing a fluorine atom. In the alkoxysilane-based compound containing a fluorine atom, for example, a silicon atom of the alkoxysilane-based compound may be directly substituted with fluorine or a substituent (for example, an alkyl group) or the like substituted on a silicon atom may be substituted with fluorine. That is to say, it may be a compound in which a fluorine-substituted alkyl group is connected to a silicon atom, but the present disclosure is not necessarily limited thereto.

More specifically, in one embodiment, the alkoxysilane-based compound containing a fluorine atom may have a perfluoropolyether group in a molecular main chain and a hydrolyzable reactive group bonded to a silicon atom at the end, but the present disclosure is not necessarily limited thereto. In this example, the hydrolyzable reactive group may form a chemical bond with a reactive group of the low-reflective adhesion reinforcement layer by a hydrolysis reaction, a condensation reaction, or the like, thereby further improving an interlayer binding force, and a fluorine functional group may be oriented on the upper surface layer of the water repellent layer to further improve an antifouling property, water repellency, oil repellency, and the like.

In one embodiment, the perfluoropolyether group may comprise a perfluorinated repeating unit selected from —($C_pF_{2p}$)—, —($C_pF_{2p}O$)—, —(CF(Z))—, —(CF(Z)O)—, —(CF(Z)$C_pF_{2p}O$)—, —($C_pF_{2p}$CF(Z)O)—, —($CF_2$CF(Z)O)—, or a combination thereof, and the like, may be linear, branched, cyclic, or a combination thereof, and may be saturated or unsaturated, but the present disclosure is not necessarily limited thereto.

In the repeating unit, p may be an integer of 1 to 10, specifically an integer of 1 to 4, more specifically an integer of 1 or 2, but the present disclosure is not necessarily limited thereto.

In addition, the Z group may be any one selected from a fluorine group, a perfluoroalkyl group, a perfluoroether group, a nitrogen-containing perfluoroalkyl group, a perfluoropolyether group, a perfluoroalkoxy group, and the like, which may be all linear, branched, or cyclic, but the present disclosure is not necessarily limited thereto.

In addition, in the perfluoropolyether group, the number of the repeating units may be, independent of each other, 0 to 200, specifically 1 to 200, and the sum of the number of the repeating units may be at least one, 20 to 100, or 30 to 50, but the present disclosure is not necessarily limited thereto, and in the perfluoropolyether group, the order of the repeating units may be arbitrary, which is not particularly limited.

A commercialized example of the alkoxysilane-based compound containing a fluorine atom may comprise KY-1901, KY-1905, and KY-19012 available from Shin-etsu, Optool DSX, UD120, and the like available from Daikin, and the like, but these alkoxysilane-based compounds containing a fluorine atom are only non-limiting examples, and the present disclosure is not necessarily limited.

When the water repellent layer formed by using an alkoxysilane-based compound containing a fluorine atom is formed on the low-reflective adhesion reinforcement layer comprising a siloxane-based compound, an interlayer binding force by a chemical bond between the water repellent layer and the low-reflective adhesion reinforcement layer may be further improved, due to a similar chemical structure between compounds comprised in the water repellent layer and the low-reflective adhesion reinforcement layer.

In addition, the alkoxysilane-based compound containing a fluorine atom may impart improved water repellent, water proof, and oil repellent functions to the water repellent layer. Therefore, the water repellent layer formed by using the alkoxysilane-based compound containing a fluorine atom may show improved water repellent properties.

In another embodiment, the optical multilayer structure may have a reflectance in accordance with ASTM E1164 of 4% or less, 3.5% or less, 3% or less, 2.8% or less, 0.5% to 4%, 1% to 4%, 2% to 3.5%, 2.5% to 4%, or 2% to 4%.

In one embodiment, the water repellent layer may have a water contact angle of 105° or more, 109° or more, 110° or more, 105° to 120°, or 105° to 115°, and may have characteristics such as improved hardness, improved wear resistance, improved scratch resistance, and improved fingerprint wipeability.

In still another embodiment, the water repellent layer may have a thickness of 100 nm or less, 50 nm or less, or 10 nm or less, but the present disclosure is not necessarily limited thereto.

Hereinafter, a method of forming a water repellent layer will be described.

The water repellent layer may be formed by preparing a composition for forming a water repellent layer, applying the composition on the low-reflective adhesion reinforcement layer, and drying the composition.

In one embodiment, the composition for forming a water repellent layer may comprise a fluorine-containing alkoxysilane-based compound, in which the fluorine-containing alkoxysilane-based compound may be the same as those described above for the water repellent layer.

In another embodiment, the composition for forming a water repellent layer may comprise a solvent, and the solvent may be any one selected from hexafluoroxylene, hydrofluorocarbon, hydrofluoroether, and the like or a combination of two or more thereof and a commercialized example of the solvent may comprise HFE-7500, 7200, 7100, and Novec 7500 available from 3M, Vertrel XF available from DuPont, ZEORORA H available from Nippon Zeon, and the like, but these solvents are only non-limiting examples, and the present disclosure is not necessarily limited.

In another embodiment, the water repellent layer may be formed by thermally curing the applied composition for forming a water repellent layer. When the water repellent layer is cured, not by photocuring, but by thermal curing, the hard coating layer and the low-reflective adhesion reinforcement layer on a lower surface of the water repellent layer may be prevented from being exposed to active energy rays (for example, ultraviolet rays) again, and in particular, the cured hard coating layer may be prevented from being exposed to light again to cause overcuring or yellowing.

In one embodiment, the thermal curing may be performed by drying at a temperature of 50° C. to 200° C. for 3 minutes to 30 minutes or at a temperature of 50° C. to 100° C. for 3 minutes to 10 minutes and then a heat treatment at a temperature of 50° C. to 200° C. for 3 minutes to 30 minutes or at a temperature of 80° C. to 150° C. for 3 minutes to 20 minutes, but the present disclosure is not necessarily limited thereto. In the above temperature range, the composition for forming a water repellent layer may be cured at a more effective rate, and an occurrence of a side reaction between each component in the composition may be effectively prevented.

In another embodiment, the optical multilayer structure may satisfy the following Equation 1:

$$25\% \geq \Delta E = (E0 - E1/E0) \times 100 \qquad \text{[Equation 1]}$$

wherein E0 is a water contact angle of the water repellent layer, and E1 is a water contact angle of the water repellent layer after applying a load of about 1 kg to a Minoan rubber stick having a diameter of 3 mm to 5 mm or 4 mm and rubbing the rubber stick about 3000 times reciprocatingly over a distance of about 15 mm at a speed of about 50 rpm on a surface of the water repellent layer.

In one embodiment, the optical multilayer structure may reduce reflectance by adjusting a refractive index difference between each layer. For example, the optical multilayer structure may satisfy the following Equation 2, Equation 3, and/or Equation 4:

$$0.05 \leq nf - n0 \leq 0.15 \qquad \text{[Equation 2]}$$

$$0.01 \leq n0 - n1 \leq 0.19 \qquad \text{[Equation 3]}$$

$$0.1 \leq nf - n1 \leq 0.35 \qquad \text{[Equation 4]}$$

wherein of is a refractive index of the substrate layer, n0 is a refractive index of the hard coating layer, and n1 is a refractive index of the low-reflective adhesion reinforcement layer.

However, the present disclosure is not necessarily limited to the ranges according to Equations 2 to 4, and for example, Equation 2 may be $0.07 \leq nf-n0 \leq 0.13$, $0.08 \leq nf-n0 \leq 0.12$, or $0.09 \leq nf-n0 \leq 0.11$; Equation 3 may be $0.01 \leq n0-n1 \leq 0.15$, $0.01 \leq n0-n1 \leq 0.10$, $0.03 \leq n0-n1 \leq 0.10$, $0.05 \leq n0-n1 \leq 0.10$, $0.05 \leq n0-n1 \leq 0.09$, or $0.06 \leq n0-n1 \leq 0.08$; and Equation 4 may be $0.1 \leq nf-n1 \leq 0.3$, $0.13 \leq nf-n1 \leq 0.2$, $0.15 \leq nf-n1 \leq 0.2$, or $0.15 \leq nf-n1 \leq 0.18$.

In another embodiment, the optical multilayer structure may further comprise a hard coating layer formed on the other surface of the substrate.

Method of Manufacturing Optical Multilayer Structure

One embodiment of the present disclosure provides a method of manufacturing the optical multilayer structure described above.

In another embodiment, the method of manufacturing an optical multilayer structure may comprise:
applying a composition for forming a hard coating layer on one surface of a substrate layer and curing the composition to form a hard coating layer;
applying a composition for forming a low-reflective adhesion reinforcement layer comprising a siloxane-based compound on the hard coating layer and drying the composition to form a low-reflective adhesion reinforcement layer; and
applying a composition for forming a water repellent layer comprising an alkoxysilane-based compound containing a fluorine atom on the low-reflective adhesion reinforcement layer and drying the composition to form a water repellent layer.

In one embodiment, the composition for forming a low-reflective adhesion reinforcement layer may further comprise an alkoxysilane-based compound having one or more functional groups.

In another embodiment, the method of manufacturing an optical multilayer structure may further comprise applying the composition for forming a hard coating layer on the other surface of the substrate layer and curing the composition to form a hard coating layer.

In one embodiment, the above descriptions of the optical multilayer structure may apply to the method of manufacturing an optical multilayer structure.

In another embodiment, the application may be performed by a die coater, an air knife, a reverse roll, a spray, a blade, casting, gravure, spin coating, and the like, but the present disclosure is not necessarily limited thereto.

In one embodiment, the step of forming a hard coating layer may be photocuring followed by thermal curing of the composition for forming a hard coating layer, but the present disclosure is not necessarily limited thereto. Herein, the thermal curing may be performed at a temperature of 100 to 200° C. for 5 to 20 minutes, but the present disclosure is not necessarily limited thereto. In one embodiment, a step of pretreatment by heating composition for forming a hard coating layer before the photocuring may be used ed, and the pretreatment may be performed at a temperature lower than the thermal curing temperature, but the present disclosure is not necessarily limited thereto.

In another embodiment, the step of drying the composition for forming a low-reflective adhesion reinforcement layer may be drying the composition at 50° C. to 150° C., 50° C. to 100° C., or 60° C. to 100° C. for 1 minute to 30 minutes, 1 minute to 20 minutes, or 1 minute to 10 minutes, but the present disclosure is not necessarily limited thereto.

In yet another embodiment, the step of curing the composition for forming a water repellent layer may comprise drying the composition at a temperature of 50° C. to 200° C. for 3 minutes to 30 minutes or at a temperature of 50° C. to 100° C. for 3 minutes to 10 minutes and then heat treating at a temperature of 50° C. to 200° C. for 3 minutes to 30 minutes or at a temperature of 80° C. to 150° C. for 3 minutes to 20 minutes, but the present disclosure is not necessarily limited thereto.

Window Cover Film and Flexible Display Panel

Another embodiment of the present disclosure may provide a window cover film comprising the optical multilayer structure, and still another embodiment of the present disclosure may provide a flexible display panel or a flexible display device comprising the window cover film.

Since the optical multilayer structure according to one embodiment may have low reflectance and improved water contact angle and wear resistance, it may be effectively applied to the window cover film and/or the flexible display panel.

The window cover film may be used for example as an outermost window substrate of a flexible display device. The flexible display device may be various image display devices such as for example a common liquid crystal display device, an electroluminescent display device, a plasma display device, and a field emission display device.

Hereinafter, the examples and the experimental examples of one embodiment will be specifically illustrated. However, the examples and the experimental examples described later are only illustrative of a part of one embodiment, and the present disclosure is not limited thereto.

Test Method

1. Refractive Index

A film was cut into a size of 3 cm×4 cm in the longitudinal direction (MD) and a width direction (TD). A refractive index in a length direction ($R_x$) and a refractive index in a width direction ($R_y$) thereof were measured at a wavelength of 543 nm using Prism coupler (Meticon, 2010/M) with TE mode. The refractive index (R) of a specimen was calculated by averaging the refractive indexes in length and width directions.

2. Water Contact Angle

The water contact angle was measured using a water contact angle meter (Kruss, DSA) in accordance with the specification of ASTM D5946.

3. Water Contact Angle after Abrasion with Rubber Stick

A film was cut into 7 cm×12 cm and fixed to a jig of a wear resistance meter (Daesung, scratch tester), and a rubber stick having a diameter of 4 mm (Minoan) was mounted and fixed to the tip. The rubber stick set with a moving distance of 15 mm, a moving speed of 50 rpm, and a load of 1 kg was rubbed 3000 times reciprocatingly on the surface of a water repellent layer, and the water contact angle of the worn surface was measured in accordance with the measurement method described in 2.

4. Scratch Resistance

A film cut into 7 cm×12 cm was fixed to equipment (Daesung, scratch tester), and a jig to which steel wool (#0000) having a size of 2 cm×2 cm was attached was mounted and fixed to the equipment. The steel wool was reciprocated 1000 times with a length of 40 mm at 40 rpm under a load of 1000 kg, it was checked with the naked eye whether the coated film was worn (scratched), and it was determined to be "O.K." when no damage occurred and not good "N.G." when damage occurred.

5. Reflectance

A specimen for measuring reflectance was cut into 5 cm×7 cm in the longitudinal direction (MD) and the width direction (TD), and then Black PET (polyethylene terephthalate) for back surface reflected light absorption was laminated on the rear surface of the film to perform manufacture. The reflectance of the manufactured specimen was measured using a spectrophotometer (Hunterlab, ColorQuest XE) in accordance with the specification of ASTM E1164.

Example 1

1-1. Preparation of Composition for Forming Hard Coating Layer 2-(3,4-epoxycyclohexyl)ethyltrimethoxysilane (ECTMS, TCI) and water were mixed at a ratio of 24.64 g:2.70 g (0.1 mol:0.15 mol) to prepare a reaction solution, which was added to a 250 mL 2-neck flask. 0.1 mL of a tetramethylammonium hydroxide catalyst (Aldrich) and 100 mL of tetrahydrofuran (Aldrich) were added to the mixture and stirring was performed at 25° C. for 36 hours.

Thereafter, layer separation was performed, a product layer was extracted with methylene chloride (Aldrich), moisture was removed from the extract with magnesium sulfate (Aldrich), and the solvent was dried under vacuum to obtain an epoxy siloxane-based resin. The weight average molecular weight of the epoxy siloxane-based resin was measured using gel permeation chromatography (GPC), and the result was 2,500 g/mol.

30 g of the epoxy siloxane-based resin as prepared above, 10 g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl) [4-(2-methylpropyl)phenyl] iodoniumhexafluorophosphate as a photoinitiator, and 54.5 g of methylethyl ketone were mixed to prepare a composition for forming a hard coating layer.

1-2. Preparation of Composition for Forming Low-Reflective Adhesion Reinforcement Layer 4.56 g (0.142 mol) of methanol, 1.44 g (0.080 mol) of water, and 1.93 g (0.019 mol) of trimethylamine were mixed in a 20 mL vial and heated to 60° C. Thereafter, 0.441 g (0.00212 mol) of tetraethyl orthosilicate (TEOS) and 1.00 g (0.00423 mol) of 3-glycidoxypropyltrimethoxysilane (GPTMS) were added thereto, stirring was performed for 1 hour, and cooling to room temperature was performed to obtain 9.37 g of a silane copolymer solution. After aging for a day, 22.1 g (0.167 mol) of propylene glycol monomethyl ether acetate (PGMEA) and 126 g (3.94 mol) of methanol were mixed to prepare a composition for forming a low-reflective adhesion reinforcement layer having a solid content of 0.7 wt %.

1-3. Preparation of Composition for Forming Water Repellent Layer

KY-1905 available from Shin-etsu containing a perfluorinated group and an alkoxysilane group was diluted with a fluorine-based solvent (Novec 7500 available from 3M) at a concentration of 0.1 wt % of a solid content to prepare a composition for forming a water repellent layer.

1-4. Preparation of Hard Coating Layer

One surface of a polyethylene terephthalate-based substrate layer (XG7PH8 available from Toray, thickness: 50 μm) was coated with the composition for forming a hard coating layer using a Mayer #7, the composition was dried at 60° C. for 4 minutes, irradiated with UV at 1 J/cm$^2$ using a high pressure metal lamp, and then cured at 120° C. for 10 minutes to prepare a hard coating layer having a thickness of 5 μm.

1-5. Preparation of Low-Reflective Adhesion Reinforcement Layer

The thus-prepared hard coating layer was coated with the composition for forming a low-reflective adhesion reinforcement layer using a Mayer bar #10 and the composition was dried at 80° C. for 5 minutes to prepare a low-reflective adhesion reinforcement layer having a thickness of 100 nm.

1-6. Preparation of Water Repellent Layer

The thus-prepared low-reflective adhesion reinforcement layer was coated with the composition for forming a water repellent layer using a Mayer bar #14, the composition was dried at 80° C. for 5 minutes, and a heat treatment was performed at 120° C. for 7 minutes to prepare a water repellent layer.

Example 2

An optical multilayer structure was manufactured in the same manner as the above, except that the step of preparing the composition for forming a low-reflective adhesion reinforcement layer of section 1-2. of Example 1 was performed as follows.

4.50 g (0.109 mol) of methanol, 1.49 g (0.0816 mol) of water, and 0.956 g (0.00944 mol) of trimethylamine were mixed in a 20 mL vial and heated to 60° C. Thereafter, 0.468 g (0.00225 mol) of tetraethyl orthosilicate (TEOS) and 1.00 g (0.00450 mol) of 3-(2-aminoethylamino)propyltrimethoxysilane (AEAPTMS) were added thereto, stirring was performed for 1 hour, and cooling to room temperature was performed to obtain 8.66 g of a silane copolymer solution. After aging for a day, 19.3 g (0.146 mol) of propylene glycol monomethyl ether acetate (PGMEA) and 111 g (1.85 mol) of 2-propanol were mixed to prepare a composition for forming a low-reflective adhesion reinforcement layer having a solid content of 0.7 wt %.

Comparative Example 1

An optical multilayer structure was manufactured in the same manner as in Example 1, except that a step of preparing the low-reflective adhesion reinforcement layer was omitted by preparing the water repellent layer right after preparing the hard coating layer.

Comparative Example 2

An optical multilayer structure was manufactured in the same manner as the above, except that the step of preparing the composition for forming a low-reflective adhesion reinforcement layer of section 1-2. of Example 1 was performed as follows.

3.17 g (0.098 mol) of methanol and 0.15 g (0.0083 mol) of water were mixed in a 20 mL vial and heated to 60° C. Thereafter, 1.0 g (0.0048 mol) of tetramethylorothosilicate (TEOS) was added thereto, stirring was performed for 1 hour, and cooling to room temperature was performed to obtain 4.32 g of a silane copolymer solution. After aging for a day, 94.1 g (2.94 mol) of methanol was mixed to prepare a composition having a solid content of 0.7 wt %.

Comparative Example 3

An optical multilayer structure was manufactured in the same manner as the above, except that the step of preparing the composition for forming a low-reflective adhesion reinforcement layer of section 1-2, of Example 1. was performed as follows.

An alkoxysilane-based compound containing an epoxy group and an alkoxysilane group (Shin-etsu, KBM-403) was diluted with an ethanol solution so that a solid content was 0.7 wt %, thereby preparing a composition.

Experimental Example> Measurement of Physical Properties

Optical multilayer structures manufactured in Examples 1 and 2 and Comparative Examples 1 to 3 were used to measure the physical properties according to 1 to 5 of <Test method>, which are shown in the following Table 1.

TABLE 1

|  |  | Example 1 | Example 2 | Comparative Example 1 | Comparative Example 2 | Comparative Example 3 |
|---|---|---|---|---|---|---|
| Thickness (nm) of low-reflective adhesion reinforcement layer | | 100 | 100 | — | 100 | 100 |
| Refractive index | Low-reflective adhesion reinforcement layer | 1.451 | 1.464 | — | 1.44 | 1.512 |
| | Hard coating layer | 1.529 | 1.529 | 1.529 | 1.529 | 1.529 |
| | Substrate layer | 1.627 | 1.627 | 1.627 | 1.627 | 1.627 |
| Reflectance (%) | | 2.5 | 2.8 | 4.9 | 2.3 | 4.6 |
| Water contact angle (°) | initial | 108 | 110 | 105 | 108 | 113 |
| | after abrasion with rubber stick | 92 | 95 | 80 | 71 | 100 |
| ΔE (%) | | 14.8 | 13.6 | 23.8 | 34.3 | 11.5 |
| Scratch resistance | | O.K | O.K | N.G. | N.G. | O.K |

In table 1, ΔE is the value of (E0−E1/E0)×100 in which E0 is an initial water contact angle of the water repellent layer, and E1 is a water contact angle of the water repellent layer after surface abrasion with a rubber stick according to 3 of <Test method>.

As evidenced from Table 1, both optical multilayer structures of the examples having a structure in which the hard coating layer and the low-reflective adhesion reinforcement layer were laminated on the substrate layer had reflectances of 4% or less, and thus, had improved optical properties, but the optical multilayer structures of the comparative examples which did not comprise the low-reflective adhesion reinforcement layer according to the examples had a reflectance higher than those of the examples.

In addition, the optical multilayer structures of the examples maintained a high water contact angle even after abrasion with a rubber stick, and thus, had improved wear resistance, and were not worn down when visually observed after the scratch resistance test. However, the optical multilayer structures of the comparative examples had poor wear resistance and scratch resistance as compared with those of the examples.

The presently disclosed optical multilayer structure comprises a hard coating layer, a low-reflective adhesion reinforcement layer, and a water repellent layer on a substrate layer, where the optical multilayer structure according to one embodiment comprises a structure in which a hard coating layer, a low-reflective adhesion reinforcement layer comprising a siloxane-based compound, and a water repellent layer comprising an alkoxysilane-based compound containing a fluorine atom are laminated on a substrate layer, thereby having a high wear resistance and a high water contact angle simultaneously.

Hereinabove, although one embodiment has been described in detail by the preferred examples and experimental examples, the scope of one embodiment is not limited to the specific examples, and should be construed by the appended claims.

What is claimed is:

1. An optical multilayer structure comprising:
    a substrate layer;
    a hard coating layer formed on a first surface of the substrate layer;
    a low-reflective adhesion reinforcement layer formed on the hard coating layer and comprises a siloxane-based compound; and
    a water repellent layer formed on the low-reflective adhesion reinforcement layer and comprises an alkoxysilane-based compound containing a fluorine atom, wherein the optical multilayer structure has a reflectance of 4% or less in accordance with ASTM E1164, and the optical multilayer structure satisfies the following Equation 1:

$$25\% \geq \Delta E = (E0-E1/E0) \times 100 \qquad \text{[Equation 1]}$$

wherein E0 is a water contact angle of the water repellent layer, and E1 is a water contact angle of the water repellent layer after applying a load of 1 kg to a Minoan rubber stick having a diameter of 4 mm and rubbing the rubber stick 3000 times reciprocatingly over a distance of 15 mm at a speed of 50 rpm on a surface of the water repellent layer.

2. The optical multilayer structure of claim 1, wherein the low-reflective adhesion reinforcement layer further comprises an alkoxysilane-based compound having one or more functional groups.

3. The optical multilayer structure of claim 2, wherein the functional group is one or more organic functional groups selected from the group consisting of an amino group, an amide group, a carboxyl group, an ester group, an acryl group, an epoxy group, and an isocyanate group.

4. The optical multilayer structure of claim 1, wherein the alkoxysilane-based compound containing a fluorine atom has a perfluoropolyether group in a molecular main chain and a hydrolyzable reactive group bonded to a silicon atom at an end of the chain.

5. The optical multilayer structure of claim 1, wherein the water repellent layer has a water contact angle of 105° or more in accordance with ASTM D5946.

6. The optical multilayer structure of claim 1, wherein the hard coating layer comprises a condensate of alkoxysilane having an epoxy group.

7. The optical multilayer structure of claim 1, wherein the substrate layer comprises a polyimide-based film comprising a chemical group derived from a fluorine-based aromatic diamine.

8. The optical multilayer structure of claim 1, wherein the substrate layer comprises a polyimide-based film comprising a chemical group derived from a fluorine-based aromatic diamine, a chemical group derived from an aromatic dianhydride, and a chemical group derived from an aromatic diacid dichloride.

9. The optical multilayer structure of claim 1, wherein the hard coating layer has a refractive index ranging from 1.50 to 1.54.

10. The optical multilayer structure of claim 1, wherein the low-reflective adhesion reinforcement layer has a refractive index ranging from 1.35 to 1.48.

11. The optical multilayer structure of claim 1, wherein the optical multilayer structure satisfies the following Equation 2:

$$0.05 \leq nf - n0 \leq 0.15 \qquad \text{[Equation 2]}$$

wherein nf is a refractive index of the substrate layer, and n0 is a refractive index of the hard coating layer.

12. The optical multilayer structure of claim 1, wherein the optical multilayer structure satisfies the following Equation 3:

$$0.01 \leq n0 - n1 \leq 0.19 \qquad \text{[Equation 3]}$$

wherein n0 is a refractive index of the hard coating layer, and n1 is a refractive index of the low-reflective adhesion reinforcement layer.

13. The optical multilayer structure of claim 1, further comprising: a hard coating layer formed on a second surface of the substrate layer opposite the first surface.

14. A method of manufacturing an optical multilayer structure, the method comprising:
applying a composition for forming a hard coating layer on a first surface of a substrate layer and curing the composition to form a hard coating layer;
applying a composition for forming a low-reflective adhesion reinforcement layer comprising a siloxane-based compound on the hard coating layer and drying the composition to form a low-reflective adhesion reinforcement layer; and
applying a composition for forming a water repellent layer comprising an alkoxysilane-based compound containing a fluorine atom on the low-reflective adhesion reinforcement layer and drying the composition to form a water repellent layer,
wherein the optical multilayer structure satisfies the following Equation 1:

$$25\% \geq \Delta E = (E0-E1/E0) \times 100 \qquad \text{[Equation 1]}$$

wherein E0 is a water contact angle of the water repellent layer, and E1 is a water contact angle of the water repellent layer after applying a load of 1 kg to a Minoan rubber stick having a diameter of 4 mm and rubbing the rubber stick 3000 times reciprocatingly over a distance of 15 mm at a speed of 50 rpm on a surface of the water repellent layer.

15. The method of manufacturing an optical multilayer structure of claim 14, wherein the composition for forming low-reflective adhesion reinforcement layer further comprises an alkoxysilane-based compound having one or more functional groups.

16. The method of manufacturing an optical multilayer structure of claim 15, further comprising: applying the composition for forming a hard coating layer on a second surface of the substrate layer opposite the first surface and curing the composition to form a hard coating layer.

17. A window cover film comprising the optical multilayer structure of claim 1.

18. A flexible display panel comprising the window cover film of claim 17.

19. A flexible optical multilayer device comprising:
a flexible substrate layer formed on the flexible substrate;
a hard coating layer formed on a first surface of the substrate layer;
a low-reflective adhesion reinforcement layer formed on the hard coating layer and which comprises a siloxane-based compound; and
a water repellent layer formed on the low-reflective adhesion reinforcement layer and which comprises an alkoxysilane-based compound containing a fluorine atom,
wherein the substrate layer, the hard coating layer, the low-reflective adhesion reinforcement layer, and the water repellent layer comprise a laminated structure, and
wherein the laminated structure satisfies the following Equation 1:

$$25\% \geq \Delta E = (E0-E1/E0) \times 100 \qquad \text{[Equation 1]}$$

wherein E0 is a water contact angle of the water repellent layer, and E1 is a water contact angle of the water repellent layer after applying a load of 1 kg to a Minoan rubber stick having a diameter of 4 mm and rubbing the rubber stick 3000 times reciprocatingly over a distance of 15 mm at a speed of 50 rpm on a surface of the water repellent layer.

* * * * *